United States Patent
Patil et al.

(10) Patent No.: US 8,832,539 B1
(45) Date of Patent: Sep. 9, 2014

(54) WRITE PROCESSING FOR UNCHANGED DATA WITH NEW METADATA

(71) Applicant: Link_A_Media Devices Corporation, Santa Clara, CA (US)

(72) Inventors: Nishant Patil, Mountain View, CA (US); Meng-Kun Lee, Cupertino, CA (US); Yingquan Wu, Palo Alto, CA (US)

(73) Assignee: SK hynix memory solutions inc., San Jose, CA (US)

( * ) Notice: Subject to any disclaimer, the term of this patent is extended or adjusted under 35 U.S.C. 154(b) by 63 days.

(21) Appl. No.: 13/739,370

(22) Filed: Jan. 11, 2013

Related U.S. Application Data

(60) Provisional application No. 61/587,539, filed on Jan. 17, 2012.

(51) Int. Cl.
  *G06F 11/00* (2006.01)
  *G06F 7/00* (2006.01)
  *G06F 11/10* (2006.01)
(52) U.S. Cl.
  CPC ................... *G06F 11/1008* (2013.01)
  USPC .......................... 714/801; 707/697

(58) Field of Classification Search
  USPC ................. 714/800, 801, 805, 746, 758, 763; 707/697, 687, 698, 707
  See application file for complete search history.

(56) References Cited

U.S. PATENT DOCUMENTS

| | | | |
|---|---|---|---|
| 6,282,671 B1 * | 8/2001 | Islam et al. | 714/6.22 |
| 6,334,168 B1 * | 12/2001 | Islam et al. | 711/113 |
| 6,848,071 B2 * | 1/2005 | Chaudhry et al. | 714/763 |
| 8,458,518 B2 * | 6/2013 | Timner et al. | 714/18 |

\* cited by examiner

*Primary Examiner* — Christine Tu
(74) *Attorney, Agent, or Firm* — Van Pelt, Yi & James LLP

(57) ABSTRACT

Old user data, old metadata, and old error correction parity information are received. New metadata corresponding to the old user data is generated. The old metadata and the new metadata are combined to obtain combined metadata. New error correction parity information is generated using the combined metadata. The old error correction parity information and new error correction parity information are combined to obtain combined error correction parity information. The old user data, new metadata, and combined error correction parity information are stored in solid state storage.

22 Claims, 5 Drawing Sheets

WRITE PROCESSING FOR UNCHANGED DATA WITH NEW METADATA

CROSS REFERENCE TO OTHER APPLICATIONS

This application claims priority to U.S. Provisional Patent Application No. 61/587,539 entitled OPTIMIZED ENCODING FOR GARBAGE COLLECTION filed Jan. 17, 2012 which is incorporated herein by reference for all purposes.

BACKGROUND OF THE INVENTION

Some types of storage, such as solid state storage, access and modify information at different levels of granularity depending upon the type of access. For example, read and write granularity in NAND Flash is at the page level, whereas erasure granularity is at the block level (where multiple pages comprise a single block). Another NAND Flash characteristic is that NAND Flash which already has some information stored in it must be erased before it can be programmed or written to again. This is because NAND Flash stores information in the form of voltage levels and the stored voltages can be incrementally increased or completely discharged, but incremental decreases in voltage are not possible.

As a result of the NAND Flash characteristics described above, current techniques require a significant number of accesses to the NAND Flash and/or a significant amount of processing, even if only a relatively small change to the block is desired. New techniques which reduce the amount of power and/or time required to make a change to already stored data would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
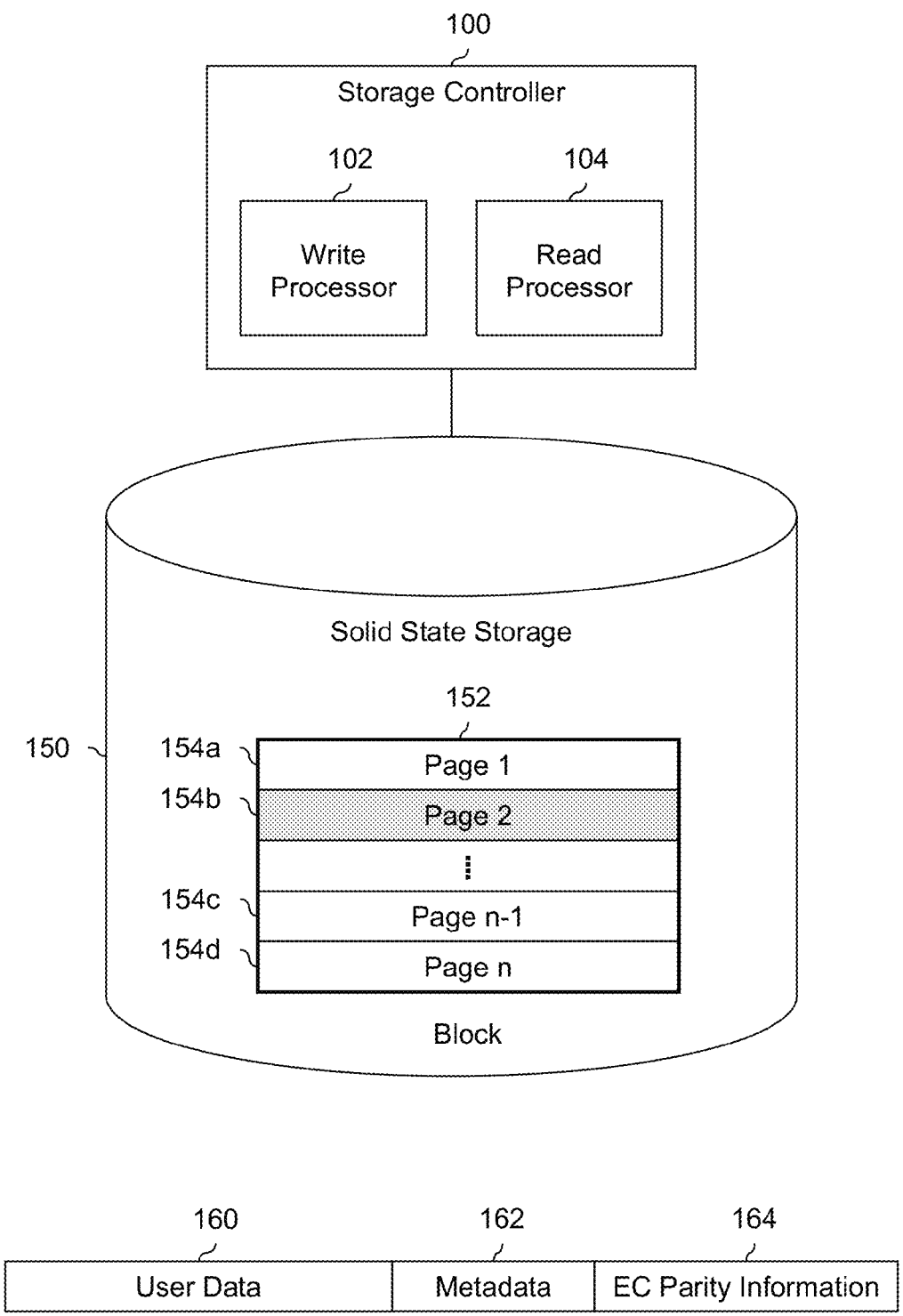
FIG. 1 is a diagram showing an embodiment of a storage system which performs a first write process and a second write process.

FIG. 1 is a diagram showing an embodiment of a storage system which performs a first write process and a second write process. In the example shown, storage controller 100 reads data from and writes data to solid state storage 150 using read processor 104 and write processor 102, respectively. In some embodiments, storage controller 100 is a semiconductor device, such as an application-specific integrated circuit (ASIC) or a field-programmable gate array (FPGA). In some embodiments, solid state storage 150 includes NAND Flash storage.

In this example, block 154 has information stored in each of pages 154a-154d. (Although FIG. 1 shows only a single block, the technique is not necessarily so limited and can (if desired) be applied to multiple blocks.) In this example, each of pages 154a-154d contains a codeword which includes user data 160, metadata 162, and error correction parity information 164. In some embodiments, error correction parity information is based upon user data 160 and metadata 162. In some embodiments, error correction parity information is associated with a systematic error correction code. A user or application wants to make a change to the user data stored in page 154b, but keep the user data in pages 154a and 154c-154d the same. The storage system show in FIG. 1 cannot do an in-place modification to just page 2 (154b) alone, so the following process is performed to modify the user data in page 154b.

Figure 2:
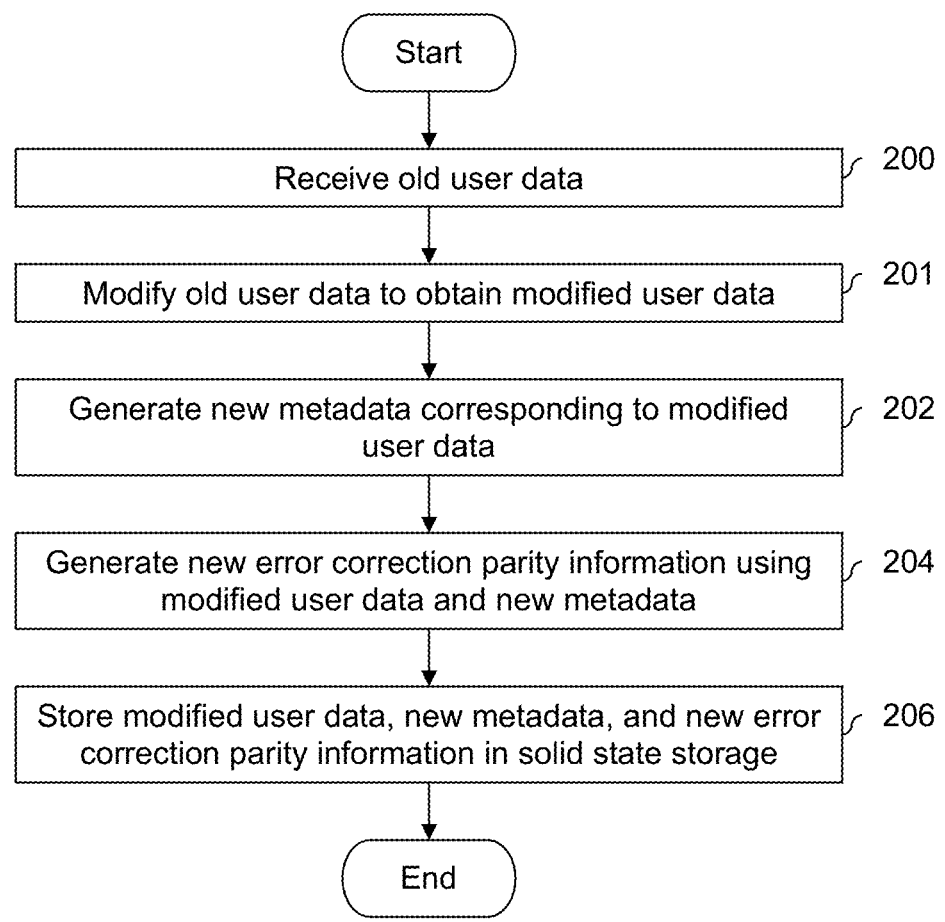
FIG. 2 is a flowchart illustrating an embodiment of a first write process performed on a page for which user data is to be modified.

Depending upon whether the user data in a given page is to be modified or not, write processor 102 performs either a first write process or a second write process. FIG. 2 is a flowchart illustrating an embodiment of a first write process performed on a page for which user data is to be modified. In FIG. 1, write processor 102 performs the process of FIG. 2 on page 2 (154b).

At 200, old user data is received. For example, read processor 104 may access page 154b and error correction decode the codeword stored there. The user data (corrected, if needed) may then be passed from read processor 104 to write processor 102. At 201, the old user data is modified to obtain modified user data. For example, write processor 102 may have an instruction from a user or higher level application about a change to make to. At 202, new metadata corresponding to the modified user data is generated. Metadata, in general, is data about data. In some embodiments, metadata generated at 202 includes the (e.g., new/final, logical/physical, etc.) location where the modified user data generated at 201 will be stored (e.g., on solid state storage 150). In some embodiments, metadata generated at 202 includes sequencing information associated with the write process. For example, sequencing information may include a sequence number, the location of prior/subsequent data in a sequence of writes (e.g., on solid state storage 150), and so on. In some embodiments, metadata includes encoding or write processing characteristics, settings, or parameters used to encode or process the received user data. A decoding process may, for example, use such metadata to know how to properly decode the stored and encoded data.

At 204, new error correction parity information is generated using the modified user data and new metadata. For example, both the modified user data and the new metadata may be input to and processed by an error correction encoder or other processor which generates the error correction parity information.

At 206, the modified user data, new metadata, and new error correction parity information are stored in solid state storage. In FIG. 1, for example, block 152 (e.g., after all processing has completed and all pages have been stored) may be located at some new location on solid state storage 150.

Figure 3:
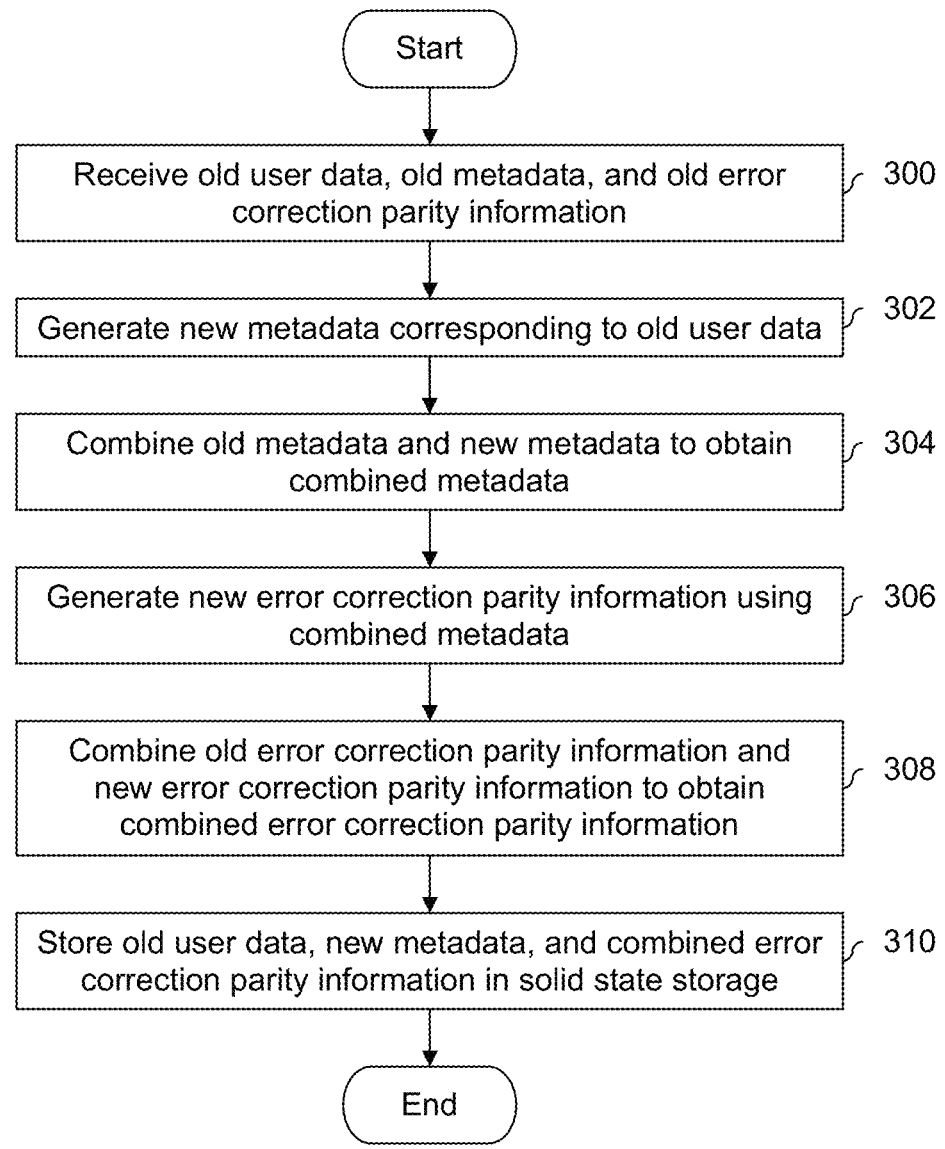
FIG. 3 is a flowchart illustrating an embodiment of a second write process performed on a page for which user data is to remain the same.

For pages 154a and 154c-154d (i.e., for which the associated user data is to remain the same), write processor 102 performs a second write process. FIG. 3 is a flowchart illustrating an embodiment of a second write process performed on a page for which user data is to remain the same. In the example of FIG. 1, write processor 102 performs FIG. 3 on pages 154a and 154c-154d. In some applications, the process shown in FIG. 3 is associated with or related to garbage collection.

At 300, old user data, old metadata, and old error correction parity information are received. In FIG. 1, for example, read processor 104 may read any of pages 154a or 154c-154d and perform error correction decoding. Old user data, old metadata, and old error correction parity information (corrected, if appropriate) associated with a given page is then passed from read processor 104 to write processor 102.

At 302, new metadata corresponding to the old user data is generated. In some embodiments, even though the user data does not change, the corresponding metadata needs to change. For example, if metadata includes location information and the page/block will be stored in a new location then new metadata which includes the new location is generated at 302 (e.g., even though the user data does not change). In another example, some sequencing information has changed (e.g., even though the user data is the same) and new metadata which has new sequencing information is generated at 302.

The old metadata and new metadata are combined to obtain combined metadata at 304. In one example, combining includes XORing the new metadata and the old metadata. New error correction parity information is generated using the combined metadata at 306. In some embodiments, step 306 excludes the input of the (unchanged) user data into an error correction encoder or error correction parity generator (e.g., the unchanged user data bypasses an error correction encoder). Some other techniques, in contrast, may input or pass the unchanged user data to an error correction encoder. Not having to input the modified user data into such a processor may save a significant number of (e.g., input and/or processing) cycles because user data may be on the order of kilobytes (KB) but (combined) metadata may be on the order of 4-8 bytes.

At 308, the old error correction parity information and new error correction parity information are combined to obtain combined error correction parity information. In some embodiments, the old error correction parity information and new error correction parity information are XORed.

The old (i.e., unmodified) user data, new metadata, and combined error correction parity information are stored in solid state storage at 310. In some embodiments, a page/block (which includes unmodified user data and/or modified user data) is stored in a new page/block location.

One benefit of the second write process described above is a reduction in the number of (e.g., input and/or processing) cycles, which in turn corresponds to a reduction in power (e.g., power consumption in semiconductors corresponds to cycles so fewer cycles used results in less power consumed). The following table compares number of cycles used. The center column shows numbers of cycles for various stages of the second write process described in the example of FIG. 3. The right column shows numbers of cycles for various stages of another write process, also associated with unmodified or unchanged user data. In that other write process, both the (unmodified) user data and new metadata are input to and processed by an error correction encoder or some other processor in order to generate the new error correction parity information.

TABLE 1

Example number of cycles

|  | FIG. 3 | Other Write Process (Process User Data and New Metadata) |
|---|---|---|
| User Data | $\dfrac{\text{User Data Length}}{\text{Encoder Unfolding Factor}}$ | $\dfrac{\text{User Data Length}}{\text{Bypass Parallelism}}$ |
| Metadata | $\dfrac{\text{(Combined) Metadata Length}}{\text{Encoder Unfolding Factor}}$ | $\dfrac{\text{(New) Metadata Length}}{\text{Encoder Unfolding Factor}}$ |
| Error Correction Parity Information | $\dfrac{\text{(Combined) Parity Length}}{\text{Encoder Unfolding Factor}}$ | $\dfrac{\text{(New) Parity Length}}{\text{Encoder Shift Parallelism}}$ |

Figure 4:
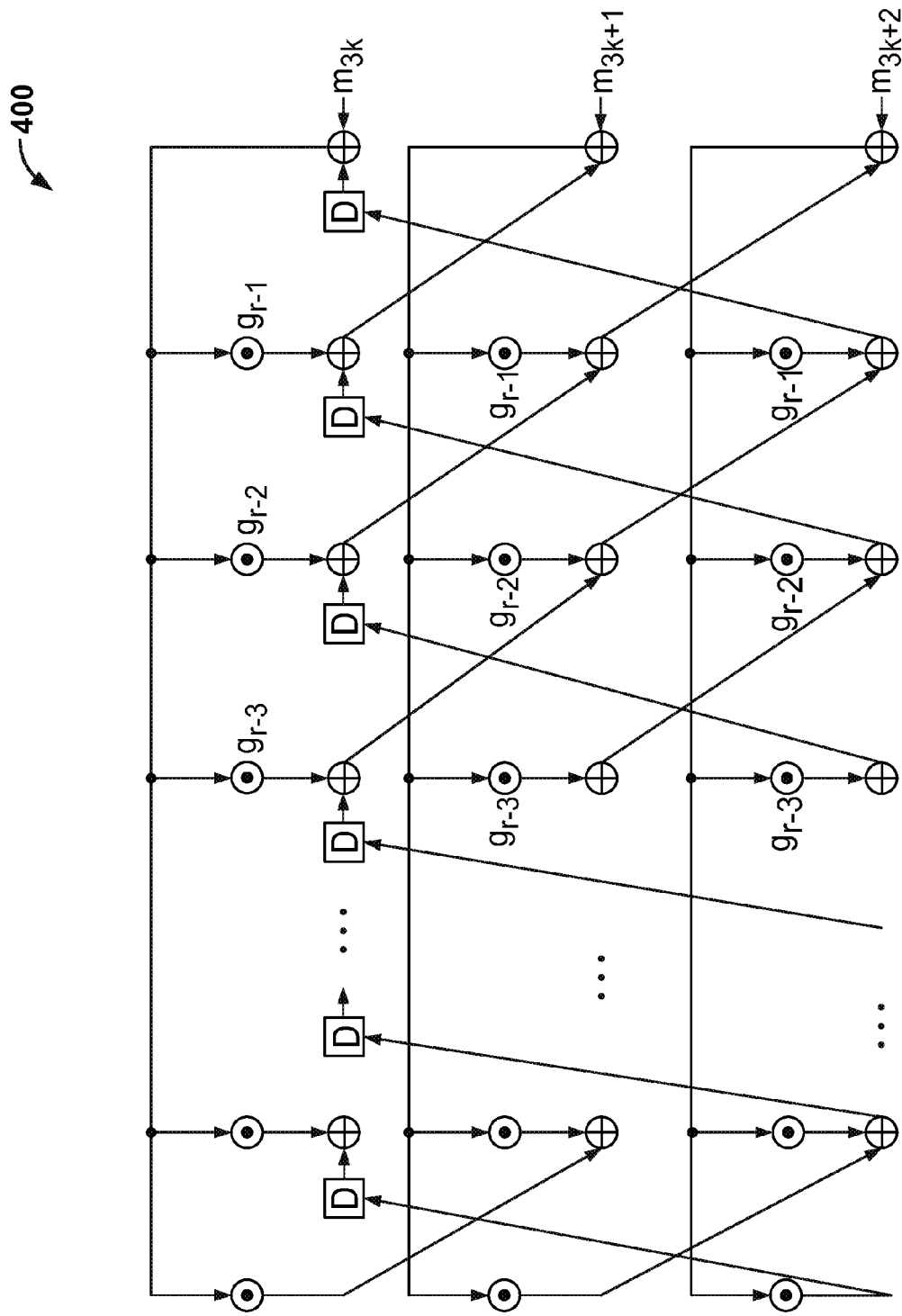
FIG. 4 is a diagram showing an embodiment of an error correction encoder with an encoder unfolding factor of 3.

Using some example values for the equations shown in Table 1, it can be shown that the second write technique uses few cycles. Encoder unfolding factor refers to the number of parallel inputs that an error correction encoder can input at the same time. FIG. 4 is a diagram showing an embodiment of an error correction encoder with an encoder unfolding factor of 3. In that example, encoder 400 can input the three samples (i.e., $m_{3k}$, $m_{3k+1}$, and $m_{3k+2}$) at the same time. Bypass parallelism refers to the parallelism with which modified user data bypasses an error correction encoder and/or is output. For example, if modified user data bypasses an error correction coder via an 8 bit bus, then bypass parallelism=8.

For the example values above (i.e., encoder unfolding factor=3 and bypass parallelism=3), the second write technique (center column in Table 1) uses fewer cycles than the other write technique (right column in Table 1). Note, for example, that the numerator in the first row (i.e., User Data Length) is the same but the denominator is different; since the value of the denominator in the center column is larger, that value is smaller. Conceptually, this is because the second write process (i.e., center column in Table 1) does not have to input the unmodified user data into an error correction encoder and process it, which saves cycles. Rather, the unmodified user data bypasses the error correction encoder (or other processor) in the second write process. The second row and the third row are the same, so the total number of cycles in the center column is less than the total number of cycles in the right column. In semiconductor devices, reducing a number of cycles also reduces the amount of power consumed; both are desirable.

Another benefit to the second write process is that the data stored according to the technique is the same and/or indistinguishable from stored data generated using other write techniques (e.g., the right column in Table 1 and/or the first write process described in FIG. 2). Since the data is the same and/or indistinguishable, performance (e.g., as measure by an error rate) does not go down. Also, an already existing read processor (e.g., read processor 104 in FIG. 1) can be used without having to make any modifications to the read processor. Since the data generated is the same and/or indistinguishable, read processor 104 does not (for example) need to be modified to differentiate between two or more types of stored data and/or how to decode (or, to put it more generally, process) those respective types of stored data.

To demonstrate that the data generated using the second write process is the same and/or indistinguishable from other write techniques, consider the following example. The original/old message polynomial u(X) has k bits of old/original user data and m bits of old/original metadata:

$$u(X) = u_{k+m-1}X^{k+m-1} u_{k+m-2}X^{k+m-2} + \ldots u_{m-1}X^{m-1} + u_1X + u_0.$$

A systematic, error correction encoder, given by:

$$g(X) = g_{N-k-m}X^{N-k-m} + g_{N-k-m-1}X^{N-k-m-1} + \ldots g_1X + g_0$$

is applied to the message (which includes the old user data and old metadata). After encoding, the old codeword (which includes the old user data, the old metadata, and the old error correction parity information) is:

$$c(X) = u(X) \cdot g(X)$$

$$c(X) = X^{N-k-m}u(X) + r(X),$$

where the first portion of the second equation (i.e., $X^{N-k-m}u(X)$) is the old/original user data and old/original metadata left shifted (since the error correction code is systematic) and the second portion of the second equation (i.e., r(X)) is the old/original error correction parity information.

Since the second write process is performed on pages where the user data remains the same, it is assured that the k bits of user data are unchanged and only the m bits of metadata may change; the new message polynomial is given by:

$$u'(X) = u_{k+m-1}X^{k+m-1} + u_{k+m-2}X^{k+m-2} + \ldots u_{m-1}'X^{m-1} + \ldots u_1'X + u_0'$$

Since the user data is unchanged, the XOR of the new codeword c'(X) and the old codeword c(X) will result in the XOR of the metadata portion:

$$c'(X) = u'(X) \cdot g(X)$$

$$c'(X) = X^{N-k-m}u'(X) + r'(X)$$

$$c'(X) + c(X) = X^{N-k-m}[u'(X) + u(X)] + r'(X) + r(X)$$

$$c'(X) + c(X) = X^{N-k-m}[(u_{m-1} + u_{m-1}')X^{m-1} + \ldots (u_0 + u_0')] + r'(X) + r(X)$$

As indicated by the last equation above (i.e., c'(X)+c(X)), the XOR of the old parity information (i.e., r(X), the last term in the summation) and the new parity information (i.e., r'(X), the second to last term in the summation) can be obtained by encoding the XOR of the old metadata and the new metadata. The new parity can be recovered by XORing this result (i.e., the encoding output of the XOR of the old metadata and the new metadata) with the old parity information to obtain the new parity information.

Figure 5:
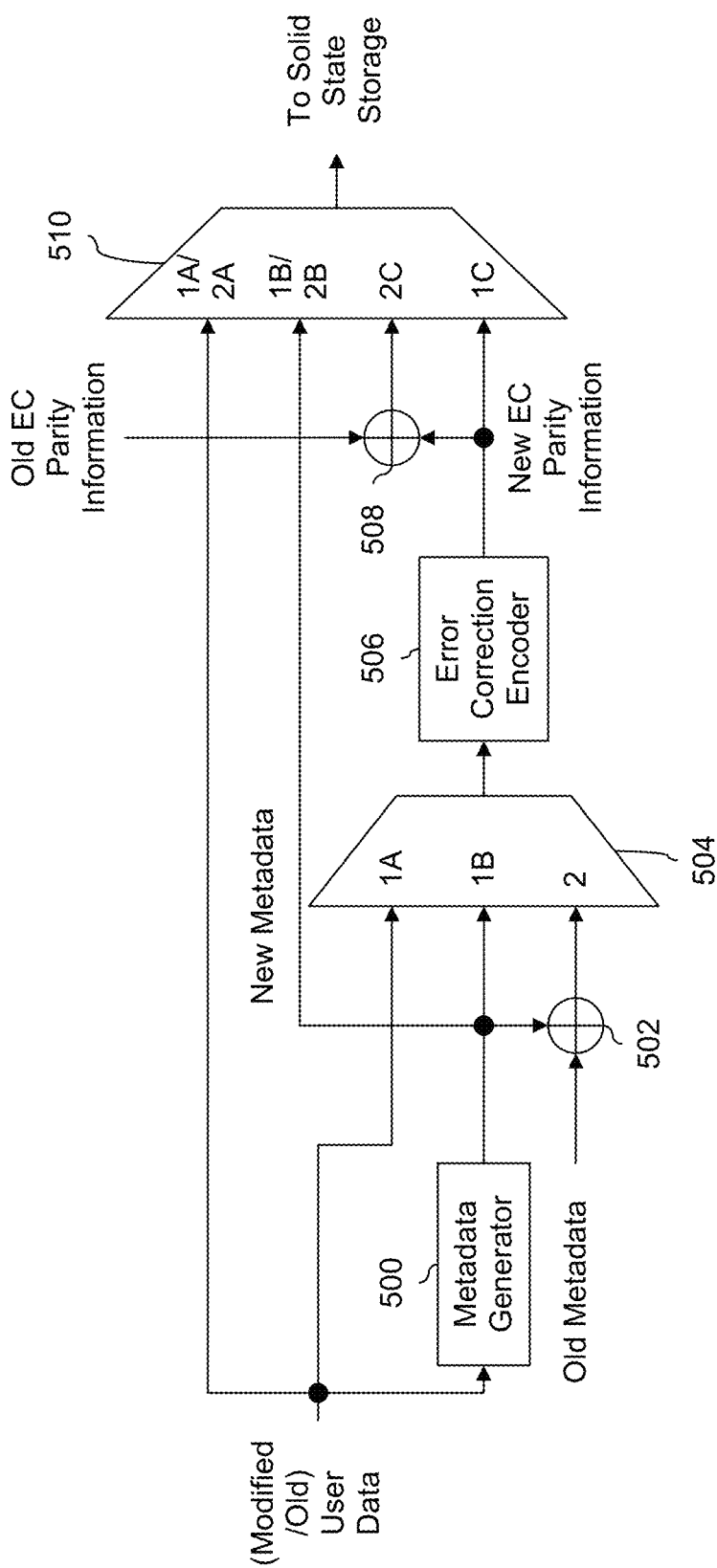
FIG. 5 is a diagram showing an embodiment of a write processor configured to perform a first write process and a second write process.

FIG. 5 is a diagram showing an embodiment of a write processor configured to perform a first write process and a second write process. In some embodiments, write processor 102 is implemented as shown in FIG. 5. User data is passed to a second multiplexer (510), a first multiplexer (504), and a metadata generator (500). In a first write mode, the user data is modified user data and in a second write mode, the user data is old user data. Metadata generator 500 generates new metadata as appropriate for a particular storage system, upper level application, etc. In one example, the metadata generator is configured to generate location information or sequence information. The new metadata output by metadata generator 500 is passed to the second multiplexer (510), the first multiplexer (504), and a combiner (502). In this particular example, combiner 502 is implemented as an XOR; in some other embodiments some other combiner is used.

First multiplexer 504 controls what information is passed to error correction encoder 506. Input 1A is connected to the (e.g., modified or old) user data, input 1B is connected to the new metadata output by metadata generator 500, and input 2 is connected to the combination of the old metadata and the new metadata. In a first write mode (e.g., shown in FIG. 2), first multiplexer 504 first selects the modified user data (i.e., input 1A) to be passed to error correction encoder 506, and then selects the new metadata (i.e., input 1B) to be passed to error correction encoder 506. In a second write mode (e.g., shown in FIG. 3), first multiplexer 504 selects the combination of the new metadata and old metadata (output by combiner 502) to be passed to error correction encoder 506.

In this particular example, error correction encoder 506 outputs only the "tail" of a codeword (i.e., the new error correction parity information) as opposed to the entire codeword. For example, error correction encoder 506 may include a parity generator matrix which generates only error correction parity information (e.g., error correction encoder 506 uses a systematic error correction code that can be expressed as the identity matrix (because the error correction code is systematic) and the parity generator matrix). The error correction parity information output by error correction encoder 506 is passed to combiner 508 and second multiplexer 510. The output of combiner 508 is also passed to second multiplexer 510 and in this example is implemented as an XOR. In some other embodiments, combiner is implemented in some other manner.

The second multiplexer (510) selects what information is passed to solid state storage. The 1A/2A input to the second multiplexer is the (e.g., modified or old) user data, the 1B/2B input to the second multiplexer is the new metadata, the 2C input to the second multiplexer is the combination of the old error correction parity information and the new error correction parity information output by combiner 508, and the 1C input to the second multiplexer is the new error correction parity information. In a first write mode, second multiplexer 510 first selects the modified user data, then the new metadata, and then the new error correction parity information (generated by error correction encoder 506). In a second write mode, second multiplexer 510 first selects the old user data, then the new metadata, and then the combined old error correction parity information and new error correction parity information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing information, comprising:
an interface configured to:
receive old user data, old metadata, and old error correction parity information; and
store the old user data, new metadata, and combined error correction parity information in solid state storage;
a metadata generator configured to generate the new metadata corresponding to the old user data;
a combiner configured to:
combine the old metadata and the new metadata to obtain combined metadata; and
combine the old error correction parity information and new error correction parity information to obtain the combined error correction parity information; and
an error correction encoder configured to generate the new error correction parity information using the combined metadata.

2. The system recited in claim 1, wherein the error correction encoder is configured to generate the new error correction parity information without using the old user data.

3. The system recited in claim 1 further comprising a processor configured to modify second old user data to obtain modified user data, wherein:
the metadata generator is further configured to generate new metadata corresponding to the modified user data;
the error correction encoder is further configured to generate new error correction parity information using the modified user data and the new metadata corresponding to the modified user data; and
the interface is further configured to store the modified user data, the new metadata corresponding to the modified user data, and the new error correction parity information in the solid state storage.

4. The system recited in claim 3, wherein the modified user data and the old user data are stored in the same block of the solid state storage.

5. The system recited in claim 1, wherein the system includes a semiconductor device, including one or more of the following: an application-specific integrated circuit (ASIC) or a field-programmable gate array (FPGA).

6. The system recited in claim 1, wherein the solid state storage includes NAND Flash storage.

7. The system recited in claim 1, wherein the combiner includes an XOR.

8. A process for processing information, comprising:
receiving old user data, old metadata, and old error correction parity information;
generating new metadata corresponding to the old user data;
combining the old metadata and the new metadata to obtain combined metadata;
using an error correction encoder to generate new error correction parity information using the combined metadata;
combining the old error correction parity information and the new error correction parity information to obtain combined error correction parity information; and
storing the old user data, the new metadata, and the combined error correction parity information in solid state storage.

9. The method recited in claim 8, wherein the error correction encoder is configured to generate the new error correction parity information without using the old user data.

10. The method recited in claim 8 further comprising:
modifying second old user data to obtain modified user data;
generating new metadata corresponding to the modified user data;
generating new error correction parity information using the modified user data and the new metadata corresponding to the modified user data; and
storing the modified user data, the new metadata corresponding to the modified user data, and the new error correction parity information in the solid state storage.

11. The method recited in claim 10, wherein the modified user data and the old user data are stored in the same block of the solid state storage.

12. The method recited in claim 8, wherein the method is performed by a semiconductor device, including one or more of the following: an application-specific integrated circuit (ASIC) or a field-programmable gate array (FPGA).

13. The method recited in claim 8, wherein the solid state storage includes NAND Flash storage.

14. The method recited in claim 8, wherein combining the old metadata and the new metadata includes using an XOR.

15. The method recited in claim 8, wherein combining the old error correction parity information and the new error correction parity information includes using an XOR.

16. A computer program product for processing information, the computer program product being embodied in a non-transitory computer readable storage medium and comprising computer instructions for:
receiving old user data, old metadata, and old error correction parity information;
generating new metadata corresponding to the old user data;
combining the old metadata and the new metadata to obtain combined metadata;
generating new error correction parity information using the combined metadata;
combining the old error correction parity information and the new error correction parity information to obtain combined error correction parity information; and
storing the old user data, the new metadata, and the combined error correction parity information in solid state storage.

17. The computer program product recited in claim 16, wherein the new error correction parity information is generated without using the old user data.

18. The computer program product recited in claim 16 further comprising computer instructions for:
modifying second old user data to obtain modified user data;
generating new metadata corresponding to the modified user data;
generating new error correction parity information using the modified user data and the new metadata corresponding to the modified user data; and
storing the modified user data, the new metadata corresponding to the modified user data, and the new error correction parity information in the solid state storage.

19. The computer program product recited in claim 18, wherein the modified user data and the old user data are stored in the same block of the solid state storage.

20. The computer program product recited in claim 16, wherein the solid state storage includes NAND Flash storage.

21. The computer program product recited in claim 16, wherein the computer instructions for combining the old metadata and the new metadata include computer instructions for using an XOR.

22. The computer program product recited in claim 16, wherein the computer instructions for combining the old error correction parity information and the new error correction parity information include computer instructions for using an XOR.

\* \* \* \* \*